US010938559B2

(12) United States Patent
Hunt

(10) Patent No.: US 10,938,559 B2
(45) Date of Patent: Mar. 2, 2021

(54) SECURITY KEY IDENTIFIER REMAPPING

(71) Applicant: ADVANCED MICRO DEVICES, INC., Santa Clara, CA (US)

(72) Inventor: Douglas Benson Hunt, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 426 days.

(21) Appl. No.: 15/838,826

(22) Filed: Dec. 12, 2017

(65) Prior Publication Data

US 2019/0182040 A1    Jun. 13, 2019

(51) Int. Cl.
*H04L 9/08*     (2006.01)
*G06F 21/78*    (2013.01)
*G06F 21/62*    (2013.01)
*G06F 12/0802*  (2016.01)
*G06F 21/60*    (2013.01)
*G06F 9/455*    (2018.01)
*H04L 29/06*    (2006.01)

(52) U.S. Cl.
CPC ........ *H04L 9/0894* (2013.01); *G06F 9/45558* (2013.01); *G06F 12/0802* (2013.01); *G06F 21/602* (2013.01); *G06F 21/6227* (2013.01); *G06F 21/78* (2013.01); *H04L 9/0897* (2013.01); *G06F 2009/45583* (2013.01); *G06F 2009/45587* (2013.01); *H04L 63/06* (2013.01)

(58) Field of Classification Search
CPC ..... H04L 9/0894; H04L 9/0897; H04L 63/06; G06F 9/45558; G06F 21/6227; G06F 21/78; G06F 21/602; G06F 12/0802; G06F 2009/45583; G06F 2009/45587
See application file for complete search history.

(56) References Cited

U.S. PATENT DOCUMENTS

| | | | |
|---|---|---|---|
| 2011/0145511 A1* | 6/2011 | Woffinden | G06F 12/1027 711/141 |
| 2017/0068669 A1* | 3/2017 | Levy | H04L 45/7453 |
| 2018/0011893 A1* | 1/2018 | Kimura | G06F 16/9027 |
| 2019/0004843 A1* | 1/2019 | Durham | H04L 69/04 |
| 2019/0087575 A1* | 3/2019 | Sahita | G06F 21/53 |
| 2019/0095350 A1* | 3/2019 | Durham | G06F 12/1408 |

* cited by examiner

*Primary Examiner* — Nelson S. Giddins

(57) ABSTRACT

Security key identifier remapping includes associating a system-level security key identifier to a local-level identifier requiring fewer bits of storage space. The remapped security key identifiers are used to receive, at a first compute complex of a processing system, a memory access request including a memory address value and a system-level security key identifier. The compute complex responds to the memory access request based on a determination of whether a security key identifier map of the first compute complex includes a mapping of the system-level security key identifier to a local-level security key identifier. In response to determining that the security key identifier map of the first compute complex does not include a mapping of the system-level security key identifier to the local-level security key identifier, a cache miss message may be returned without probing caches of the first compute complex.

20 Claims, 4 Drawing Sheets

US 10,938,559 B2

SECURITY KEY IDENTIFIER REMAPPING

BACKGROUND

In many processor applications, security of information is an important feature. For example, a processor can be used in a server in an Infrastructure As A Service (IAAS) environment, wherein the processor executes one or more virtual machines (VMs) and executes a hypervisor to partition the server hardware among the VMs and to isolate the VMs from each other. Different VMs may be executed on behalf of different customers, so it is desirable that the information (instructions and data) employed by each VM be protected from access by other VMs and by the hypervisor. However, flaws (e.g., bugs) in the hypervisor can cause the hypervisor itself to be vulnerable to exploitation, allowing the hypervisor or a VM to access the information of another VM.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for protecting secure information at a processing system by employing a hardware encryption module in the processor's memory access path to cryptographically isolate the secure information. In some embodiments, the encryption module is located at a memory controller of the processor, and each memory access request provided to the memory controller includes a security key identifier identifying the source of the memory access request and corresponding to a unique encryption key that is used to encrypt and decrypt data associated with the memory access request. However, as the number of unique security keys increases, the amount of storage needed to keep track of the associated security key identifiers also increases. Accordingly, in various embodiments described herein, the processing system utilizes security key identifier remapping to associate a system-level security key identifier to a local-level identifier requiring fewer bits of storage space.

In some embodiments, the remapped security key identifiers are used to receive, at a first compute complex of a processing system, a memory access request including a memory address value and a system-level security key identifier. The compute complex responds to the memory access request based on a determination of whether a security key identifier map of the first compute complex includes a mapping of the system-level security key identifier to a local-level security key identifier. For example, in response to determining that the security key identifier map of the first compute complex does not include a mapping of the system-level security key identifier to the local-level security key identifier, a cache miss message may be returned without probing caches of the first compute complex. Because there must always be a mapping within a compute complex for any line in the security key identifier map which maps to an encrypted address, an incoming probe which does not match any mappings in the security key identifier map can be responded to with a cache miss without any cache access/tag check. By enabling the system to respond to a cache probe without actually probing the caches of the compute complex, the operating efficiency (e.g., due to both time and power savings) of the processing system is increased.

Figure 1:
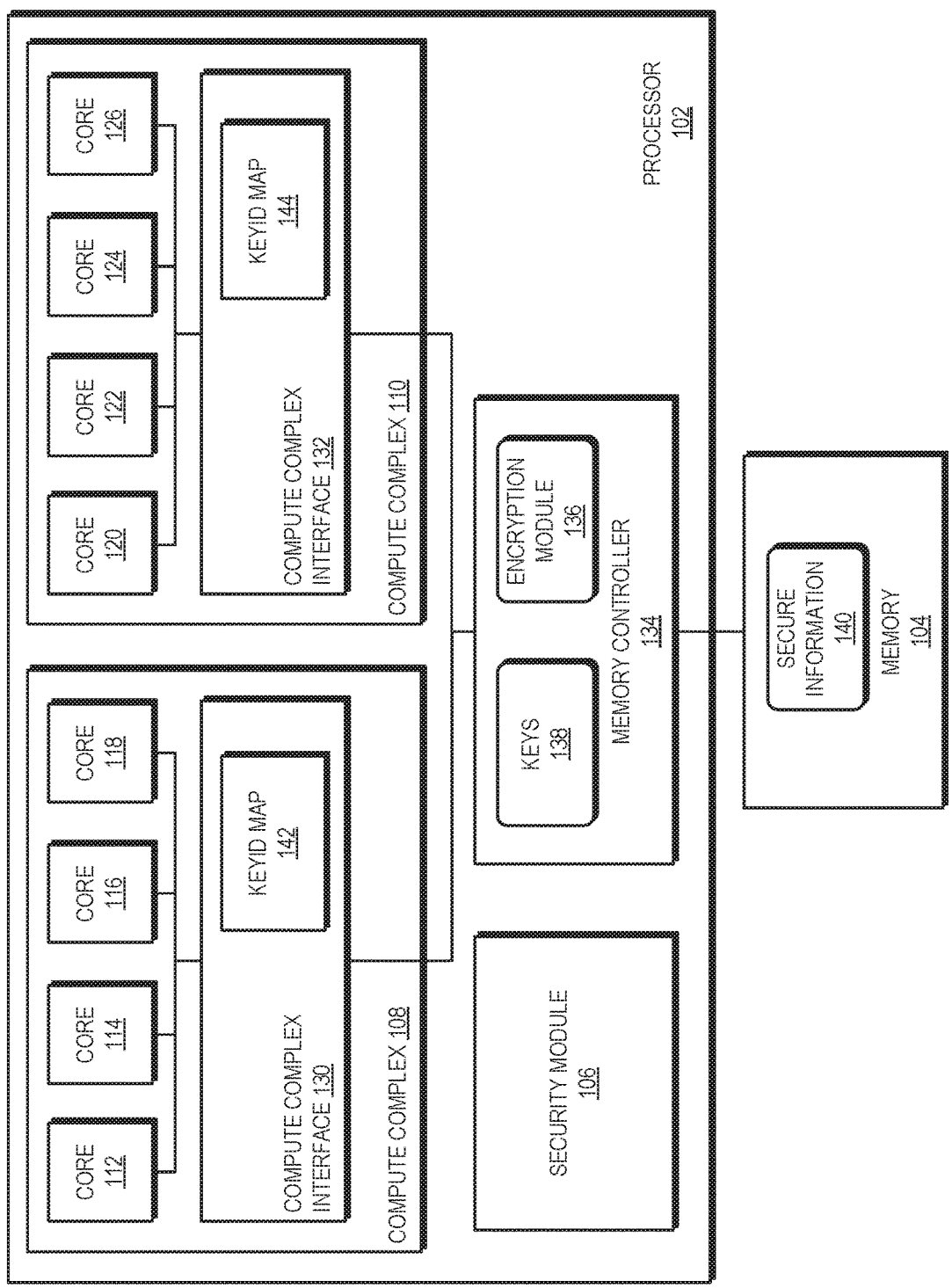
FIG. 1 is a block diagram of a processing system employing a security module that supports security key identifier remapping in accordance with some embodiments.

FIG. 1 illustrates a processing system 100 that supports security key identifier remapping in accordance with some embodiments. The processing system 100 includes a processor 102 and a memory 104. The processing system 100 can be incorporated in any of a variety of electronic devices, such as a server, personal computer, tablet, set top box, gaming system, and the like. The processor 102 is generally configured to execute sets of instructions (e.g. computer programs) that manipulate the circuitry of the processor 102 to carry out defined tasks. The memory 104 facilitates the execution of these tasks by storing data used by the processor 102. In various embodiments, the memory 104 includes dynamic random access memory (DRAM), non-volatile memory such as flash memory or a hard disk drive (HDD), and the like, or a combination thereof.

The processor 102 includes a security module 106. The security module 106 is a general purpose processor, field programmable gate array (FPGA), application specific integrated circuit (ASIC), mode of operation of a processor core, or other module designed and configured to perform security operations for the processing system 100, including registration of entities (e.g., virtual machines, computer programs, and the like) to be executed at the processor 102, generation and identification of security keys for the entities to be executed, authentication of the processing system 100 for security operations, and the like. In some embodiments, the security module 106 undergoes a secure registration process before it is permitted to execute its operations, and has its operations restricted to security operations only, so that it cannot execute operations that leave it vulnerable to exploitation. As described further herein, the security module 106 supports the cryptographic isolation of information at the processing system 100 by generating security keys, identifying the entities registered to be executed at the processing system 100, and other operations that enable such cryptographic isolation.

The processor also includes compute complexes 108 and 110, and a memory controller (e.g., a northbridge) 134. The compute complexes 108 and 110 each include a plurality of processor cores. For example, compute complex 108 includes the four processor cores 112, 114, 116, and 118. Compute complex 110 includes the four processor cores 120, 122, 124, and 126. In various embodiments, the processor cores are central processing unit (CPU) cores, graphics processing unit (GPU) cores, digital signal processor (DSP) cores, or any combination thereof. Further, it will be appreciated that, in various embodiments, the compute complexes 108 and 110 include fewer or more than four processor cores. The processor cores 112-126 are processing units that individually and concurrently execute instructions. In some embodiments, each of the processor cores 112-126 includes an individual instruction pipeline that fetches instructions, decodes the fetched instructions into corresponding operations and, using the resources of the processing system 100, executes the operations, including memory access requests.

Each compute complex 108 and 110 includes its own compute complex interface that connects processor cores of the respective compute complexes out to other components of the processing system, such as a memory controller 134 as illustrated in FIG. 1. As illustrated, the compute complex 108 includes a compute complex interface 130 that operates as an interface through which processor cores 112, 114, 116, and 118 communicate out of the compute complex 108 to other components of the processing system 100. Similarly, components of the processing system 100 communicate to the processor cores 112, 114, 116, and 118 via compute complex interface 130. The compute complex 110 includes a compute complex interface 132 that operates as an interface through which processor cores 120, 122, 124, and 126 communicates out of the compute complex 110 to other components of the processing system 100. Similarly, components of the processing system 100 communicate to the processor cores 120, 122, 124, and 126 via compute complex interface 132.

In some embodiments, the processing system 100 implements a security scheme whereby a security designation for information (e.g., whether the information is to be cryptographically protected) is assigned based on control bits included with the memory address corresponding to where the information is stored at the memory 104 or corresponding to the type of information (e.g. instructions or data). This allows large collections of data to be easily classified as secured information, providing for efficient information protection. For example, in some embodiments, the control bits are set by the processing system 100 so that particular types of information, such as instruction information, or page table information that provides a mapping of virtual addresses to physical addresses of the memory 104, are designated as secured information, thereby cryptographically protecting this information as described further below. The control bits for addresses assigned to data can be designated in a more fine-grained fashion based on, for example, designations requested by programs executing at the processor 102. This security scheme provides for protection of crucial data (preventing, for example, unauthorized execution of a virtual machine or its programs) while still providing flexibility for more general data.

In some embodiments, because the security type assigned to information is designated based on the information's corresponding memory address, the processing system 100 uses the page tables themselves to indicate the security type for each memory address. Accordingly, the processor 102 identifies the type of memory access request in the course of identifying the memory address corresponding to the memory access request. In particular, if the memory address is indicated as storing secured information, the corresponding memory access is identified as a secure memory access. Similarly, if the memory address is indicated as storing non-secured information, the corresponding memory access is identified as a non-secure memory access.

In the course of executing sets of instructions, the processor 102 generates memory access requests, including write requests to store data at the memory 104 and read requests to retrieve data from the memory 104. Each memory access request includes a memory address (e.g. a system physical address) indicating a location at the memory 104 targeted by the memory access request. In response to a read request, the memory 104 retrieves information (data or instructions) stored at the location corresponding to the memory address of the read request and provides the information to the processor 102. In response to a write request, the memory 104 stores write information of the request at the location corresponding to the memory address of the write request.

To provide for cryptographic isolation of information, the memory controller 134 includes an encryption module 136 configured to encrypt and decrypt information according to a specified cryptographic standard, and based on encryption keys 138. In some embodiments, the encryption module 136 is configured to employ Advanced Encryption Standard (AES) encryption and decryption, but in other embodiments the encryption module 136 employs other encryption/decryption techniques. The memory controller 134 provides an interface for the processor 102 to communicate with the memory 104. In some embodiments, the memory controller 134 performs other functions, such as interfacing with an input/output controller (e.g., a southbridge, not shown), and providing an interface between different processor cores. The memory controller 134 receives memory access requests from the compute complexes 108, 110 and controls provision of those requests to the memory 104. In addition, the memory controller 134 receives responses to memory access requests from the memory 104 and controls provision of the responses to the requesting processor cores of compute complexes 108, 110. In some embodiments, the memory controller 134 receives memory access requests (e.g., direct memory access requests) from input/output devices (not shown) of the processing system 100 and controls their provision to the memory 104.

Each of the processor cores 112-126 is configured to identify each memory access request as one of two types: a secure memory access request, indicating that the information corresponding to the memory access request is designated for cryptographic protection, or a non-secure memory access request, indicating that the information corresponding to the memory access request is not designated for cryptographic protection. In response to receiving a write request, the memory controller 134 identifies whether the request is a secure memory access request or a non-secure memory access request. If the write request is a non-secure memory access request, the northbridge 134 bypasses the encryption module 136 and provides the write request to the memory 104 without encrypting the information to be written. If the write request is a secure memory access request, the northbridge 134 identifies one of the encryption keys 138 that is assigned to the entity (e.g., program, VM, software service, and the like) that generated the memory access request. In some embodiments, the encryption module 136 identifies and selects the key based on a security key identifier (i.e., KeyID), as further described herein, assigned to the entity that generated the memory access request. The encryption module 136 employs the selected key to encrypt the information to be written and provides the write request, with the encrypted information, to the memory 104 for storage. In some embodiments, the encryption module 136 uses both the selected key and the physical address of the memory access request for encryption and decryption of the corresponding information thereby preventing block move attacks.

In response to receiving a read request (e.g., from one of the processor cores 112-118 of compute complex 108), the memory controller 134 provides the request to the memory 104 and subsequently receives the information responsive to the request. If the memory controller 134 identifies the read request as a non-secure memory access request, it bypasses the encryption module 136 and provides the read information to the requesting processor core without encryption. If the memory controller 134 identifies the read request as a secure memory access request, the encryption module 136 identifies and selects one of the encryption keys 138 based on the security key identifier (i.e., KeyID) assigned to the entity that generated the read access request and the encryption module 136 decrypts the read information. The memory controller 134 then provides the decrypted read information to the requesting processor core.

Accordingly, the encryption module 136 performs encryption (for write accesses) or decryption (for read accesses) of the data associated with the memory access requests. For secure memory accesses, the encryption module 136 performs encryption (for write accesses) or decryption (for read accesses) of the data associated with the memory access. Because the encryption is done by hardware in the processor's memory access path, the data stored at the memory 104 is not meaningfully accessible without the correct encryption/decryption key, as described further below.

In the illustrated example of FIG. 1, the memory access path of the processing system 100 is such that the processor cores store information, including secure information, in an unencrypted form (e.g., at a local cache of the processor cores/compute complex). Accordingly, in some embodiments the cache (not shown) stores, for each storage location of a given size (e.g., a cache line), entity tag information identifying a particular program or other entity (e.g., a VM) that is authorized to access the information at the storage location. Each VM provides a secure and isolated hardware-emulation environment for one or more virtual processors, whereby each virtual processor executes a corresponding guest operating system (OS) (not shown). Each guest OS/virtual processor typically is identified using a particular security key identifier, referred to herein as a "KeyID." Every memory location (i.e., cache lines lines) is associated with a KeyID. In particular, each cache line includes a KeyID as a portion of the address field that identifies a particular one of the encryption keys 138 to be used for encryption and/or decryption.

Each compute complex (e.g., compute complexes 108, 110) includes its own KeyID mapping table that tracks the KeyIDs active in a given compute complex at a given time. For example, as illustrated in FIG. 1, compute complex 108 includes a KeyID mapping table 142 at compute complex interface 130 that tracks the KeyIDs assigned to each guest OS/virtual processor executing at compute cores 112-118. Similarly, compute complex 110 includes a KeyID mapping table 144 at compute complex interface 132 that tracks the KeyIDs assigned to each guest OS/virtual processor executing at compute cores 120-126. Those skilled in the art will recognize that the processing system 100 supports more encryption keys 138 (and associated KeyIDs) than could be used simultaneously within any single compute complex. Accordingly, to reduce hardware overhead necessary for keeping track of KeyIDs, the processing system 100 implements security key remapping in which the KeyID mapping tables 142, 144 maps the KeyIDs used at the memory controller 134 (hereinafter referred to as "system-level KeyIDs") to a smaller, local-level KeyID (i.e., local to the compute complexes) requiring fewer bits. Since there are fewer local-level KeyIDs than system-level KeyIDs, fewer bits of storage are needed to track the KeyIDs which are active in a given compute complex at a given time, as described further below.

Figure 2:
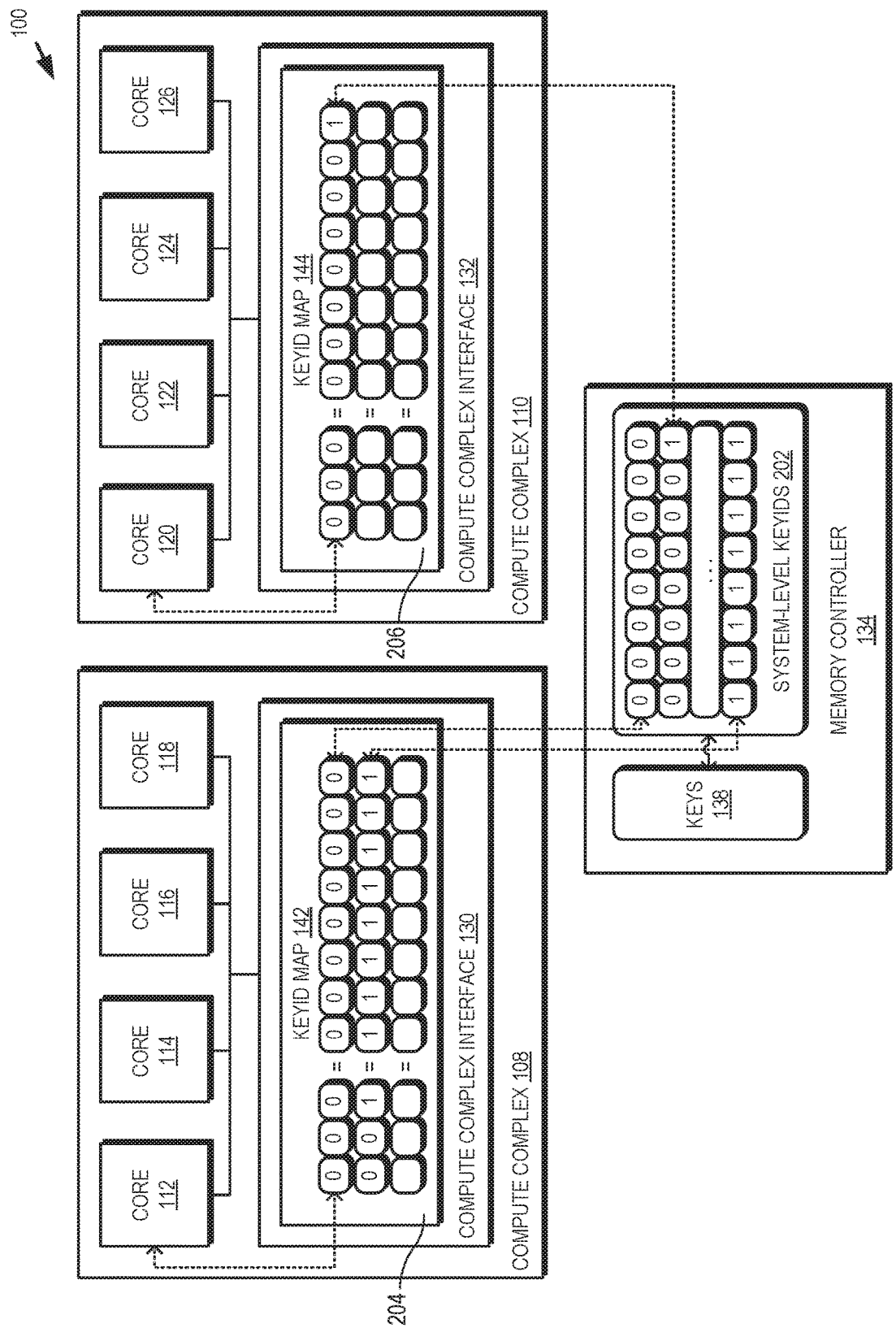
FIG. 2 is a block diagram illustrating an example of security key identifier remapping in accordance with some embodiments.

FIG. 2 is a diagram illustrating, in accordance with some embodiments, an example of security key remapping in the processing system 100 of FIG. 1. As shown, the memory controller 134 keeps track of 8-bit system-level KeyIDs 202 and the encryption keys 138 to which they are assigned. An 8-bit system-level KeyID allows for 256 unique KeyIDs to be assignable to different virtual guests running in the processing system 100. Although there can be as many as 256 different virtual guests running, no single compute complex is capable of concurrently running all 256 different virtual guests due to the limited number of compute cores within each compute complex. Accordingly, rather than devoting eight bits to each storage location (e.g., cache lines and translation lookaside buffers (TLB)) within the compute complexes, the compute complexes each include a KeyID mapping table that performs a translation between the 8-bit system-level KeyIDs 202 to a smaller set of local-level KeyIDs.

The local-level KeyIDs are 3-bit values that allow for eight unique local-level KeyIDs per compute complex. As illustrated in FIG. 2, compute complex 108 includes a KeyID mapping table 142 that tracks the 3-bit local-level KeyIDs 204 assigned to guest OS/virtual processors executing at compute cores 112-118. Similarly, compute complex 110 includes a KeyID mapping table 144 that tracks the 3-bit local KeyIDs 206 assigned to guest OS/virtual processors executing at compute cores 120-126. When addressing cache lines, the compute cores only need to include the 3-bit local KeyID, thereby providing a hardware savings of 5 bits per cache line.

In the example of FIG. 2, the KeyID mapping table 142 assigns for a virtual guest running at compute core 112 a local-level KeyID having the bit value "000", which is mapped to a system-level KeyID having the bit value "00000000". The KeyID mapping table 142 also assigns for a virtual guest running at a different compute core a local KeyID having the bit value "001", which is mapped to a system-level KeyID having the bit value "11111111". When requesting access to cache lines, the compute core 112 only needs to include the shorter 3-bit local KeyID of value "000" in the address field rather than including the longer 8-bit value of "00000000".

The local KeyIDs are specific to each compute complex, and a given local-level KeyID in one compute complex does not necessarily map to the same system-level KeyID as that same local-level KeyID in a different compute complex. For example, as illustrated in FIG. 2, the local-level KeyID of bit value "000" in compute complex interface 130 is mapped to the system-level KeyID of bit value "00000000". However, that same local-level KeyID of bit value of "000" is mapped to the system-level KeyID of bit value "00000001" in compute complex 110 for a virtual guest running at compute core 120. When requesting access to cache lines, although the compute core 120 includes the same 3-bit local KeyID of value "000" as compute core 112, the different system-level KeyID to which it is mapped will result in a different encryption key to be used when reading from and/or writing to memory (e.g., memory 104 of FIG. 1).

Thus, usage of KeyID mapping tables at the compute complexes allow for support of a system-wide resource (i.e., 8-bit KeyID 202) while saving on storage within each compute complex via the local remapping to 3-bit local-level KeyIDs 204, 206. By creating multiple mappings from the local-level to system-level, the processing system 100 is able to support 256 unique KeyIDs, but yet only has to utilize 3 bits within each compute complex 108, 110. That is, the remapping at the KeyID mapping tables 142, 144 allow the processor cores 112-126 to specify a full 8-bit system-level KeyID 202 while only using 3-bits. Within each compute complex 108, 110, the only location where the full 8-bit value has to be tracked is at the KeyID mapping tables 142, 144.

Those skilled in the art will recognize that the 8-bit system-level KeyID to 3-bit local-level KeyID mapping described herein is provided for example purposes only. In other embodiments, system- and local-level KeyIDs having shorter and longer bit lengths may be used without departing from the scope of this disclosure. For example, in some embodiments, a system-level KeyID having fewer than 8-bits is used to support fewer than 256 unique KeyIDs for the processing system 100. In other embodiments, a system-level KeyID having more than 8-bits is used to support more than 256 unique KeyIDs for the processing system 100. Similarly, in other embodiments, a local-level KeyID having fewer than 3-bits is used to support fewer than eight cores within each compute complex and a local-level KeyID having more than 3-bits is used to support more than eight cores within each compute complex.

Figure 3:
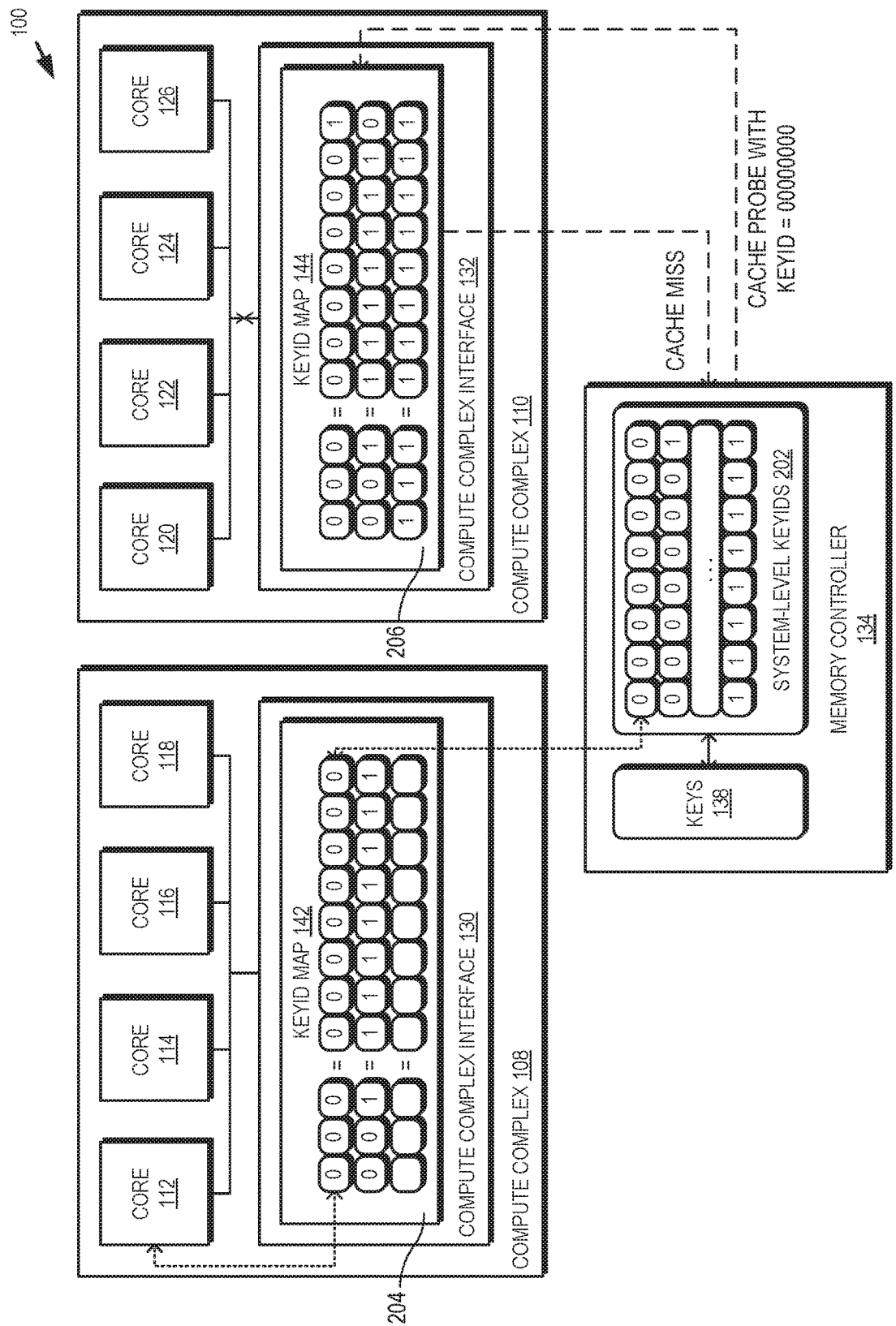
FIG. 3 is a block diagram illustrating an example of a probe response to a cache probe in the processing system of FIG. 1 in accordance with some embodiments.

FIG. 3 is a diagram illustrating, in accordance with some embodiments, an example of quick probe responses in the processing system 100 of FIG. 1. As shown, the KeyID mapping table 142 assigns for a virtual guest running at compute core 112 a local-level KeyID having the bit value "000", which is mapped to a system-level KeyID having the bit value "00000000". If the compute core 112 attempts to access a cache line that is, for example, not cached locally within compute complex 108, the address targeted by the memory access request is translated at the KeyID mapping table 142 to convert the 3-bit local-level KeyID portion of the address field (e.g., bit value "000") to the 8-bit system-level KeyID (e.g., bit value "00000000") before communicating the memory access request to the memory controller 134.

The memory controller 134 attempts to locate a copy of the data targeted by that memory access request (which may be cached in a different compute complex) by issuing a cache probe to other compute complexes (i.e., compute complex 110 in FIG. 3) prior to retrieving the data from memory (e.g., memory 104 of FIG. 1). The cache probe to compute complex 110, which includes the 8-bit system-level KeyID and the address targeted by the memory access request, is received at the compute complex interface 132. Due to the system-level KeyID to local-level KeyID mapping of the KeyID mapping table 144, if a probe is received and the KeyID mapping table 144 does not contain a mapping of the 8-bit system-level value "00000000", it is known that the compute complex 110 does not have any compute cores assigned to run virtual guests associated with system-level KeyID "00000000" and therefore does not have any cached copies of the requested cache line. Accordingly, the compute complex interface 132 at compute complex 110 responds to the cache probe with a cache miss message without needing to convert the system-level KeyID to the local-level KeyID and probe the compute cores 120-126. That is, the compute complex interface 132 is able to provide a quick probe response of a cache miss without having to perform any cache lookups, thereby providing a power savings and performance benefit over traditional cache probes.

Figure 4:
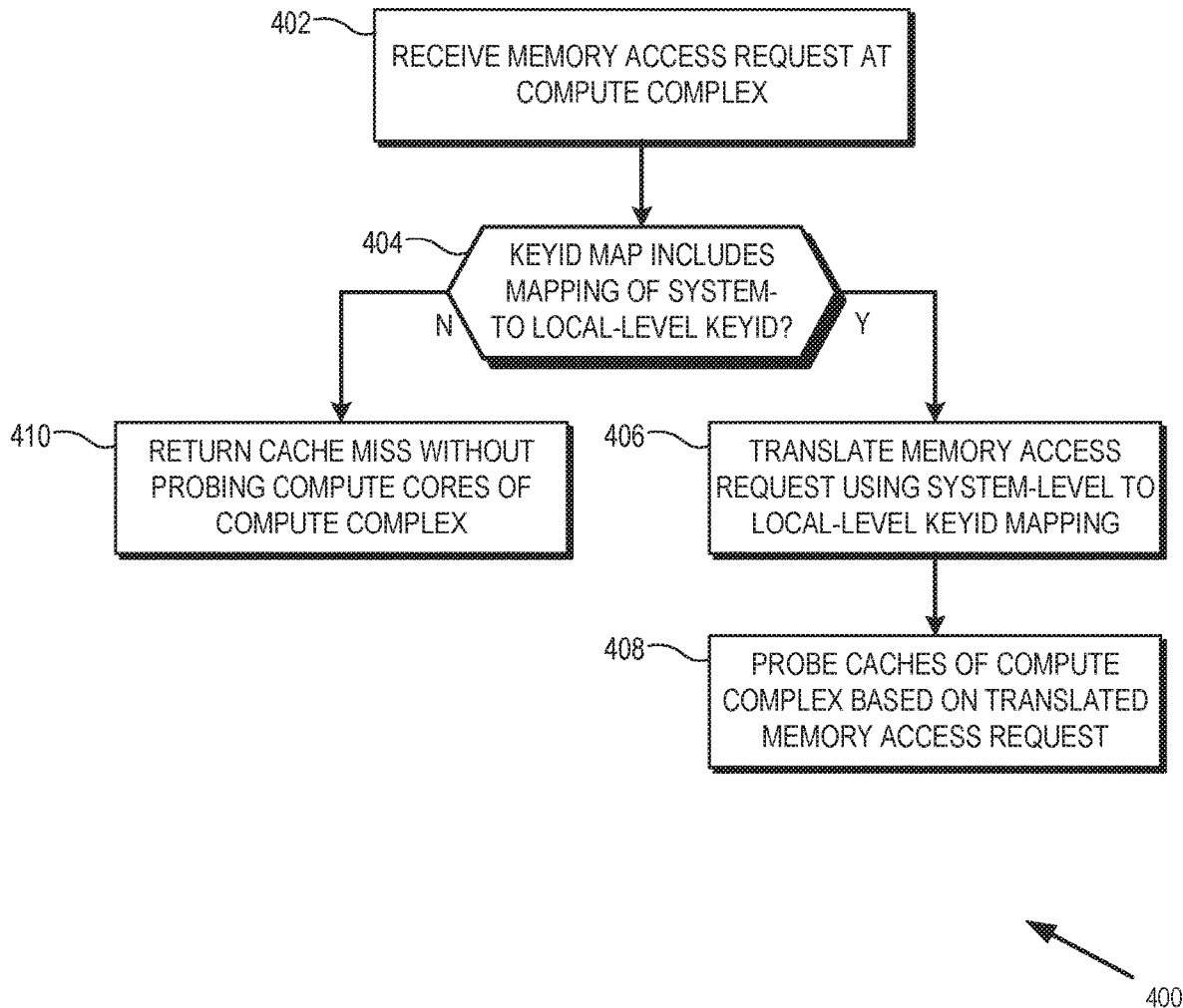
FIG. 4 is a flow diagram illustrating a method for processing memory requests in the processing system of FIG. 1 in accordance with some embodiments.

FIG. 4 illustrates a flow diagram of a method 400 of processing memory access requests at a compute complex in accordance with some embodiments. For purposes of description, the method 400 is described with respect to an example implementation at the compute complex 110 of FIG. 3. At block 402, the compute complex interface 132 receives a memory access request from the memory controller 134. In various embodiments, the memory access request is a request generated by an entity (e.g., a virtual guest) running on one of the compute cores 112-118. The memory access request includes a memory address (e.g. a system physical address) targeted by the memory address request and a system-level KeyID 202 assigned to the entity.

At block 404, the compute complex interface 132 determines whether the KeyID map 144 contains a mapping of the system-level KeyID included with the memory access request to a local-level KeyID. If a system-level to local-level KeyID mapping is present, the method 400 moves to block 406 and the compute complex interface 132 translates the memory access request by converting the system-level KeyID (e.g., 8-bit value as illustrated in FIGS. 2-3) portion of the memory access request to a local-level KeyID (e.g., 3-bit value as illustrated in FIGS. 2-3). The translated memory access request is used in block 408 to probe the caches of cores 120-126 to determine whether the requested cache line is present within compute complex 110.

Returning to block 404, if the compute complex interface 132 determines that the KeyID map 144 does not contain a mapping of the system-level KeyID included with the memory access request to a local-level KeyID, it is known that the compute complex 110 does not have any compute cores assigned to run an entity associated with the received system-level KeyID (e.g., virtual guests associated with system-level KeyID "00000000" of FIG. 3). Therefore, the compute complex 110 does not have any cached copies of the requested cache line which the requesting entity is authorized to access. Accordingly, the method 400 proceeds to block 410 in which the compute complex interface 132 at compute complex 110 responds to the memory access request with a cache miss message without needing to convert the system-level KeyID to the local-level KeyID and probing the compute cores 120-126.

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
receiving, at a first compute complex of a processing system, a memory access request including a memory address value and a system-level security key identifier corresponding to an encryption key to encrypt and decrypt data associated with the memory access request; and
responding, based on a determination of whether a security key identifier map of the first compute complex includes a mapping of the system-level security key identifier to a local-level security key identifier, to the memory access request.

2. The method of claim 1, wherein responding to the memory access request comprises:
returning, in response to determining that the security key identifier map of the first compute complex does not include a mapping of the system-level security key identifier to the local-level security key identifier, a cache miss message without probing caches of the first compute complex.

3. The method of claim 2, further comprising:
transmitting, in response to the cache miss message, the memory access request to a memory of the processing system; and
accessing data at the memory address value of the memory using a security key corresponding to the system-level security key identifier.

4. The method of claim 1, further comprising:
generating, at a second security key identifier map of a second compute complex, an initial memory access request including the memory address value and a local-level security key identifier; and
generating the memory access request at the second compute complex based on the second security key identifier map and the initial memory access request; and
transmitting the memory access request to a memory controller of the processing system.

5. The method of claim 4, wherein generating the memory access request comprises:
translating, based on a mapping within the second security key identifier map, the local-level security key identifier of the initial memory access request to the system-level security key identifier, wherein the system-level security key identifier includes more bits than the local-level security key identifier.

6. A processor, comprising:
a memory controller; and
a first compute complex to:
receive a memory access request including a memory address value and a system-level security key identifier corresponding to an encryption key to encrypt and decrypt data associated with the memory access request; and
respond, based on a determination of whether a security key identifier map of the first compute complex includes a mapping of the system-level security key identifier to a local-level security key identifier, to the memory access request.

7. The processor of claim 6, wherein the first compute complex is further to:
return, in response to determining that the security key identifier map of the first compute complex does not include a mapping of the system-level security key identifier to the local-level security key identifier, a cache miss message without probing caches of the first compute complex.

8. The processor of claim 7, wherein the memory controller is further to:
transmit the memory access request to a memory system; and
access data at the memory address value of the memory using a security key corresponding to the system-level security key identifier.

9. The processor of claim 8, wherein the memory controller is further to:
decrypt data read from the memory address value of the memory using the security key corresponding to the system-level security key identifier.

10. The processor of claim 8, wherein the memory controller is further to:
encrypt data using the security key corresponding to the system-level security key identifier for writing to the memory address value of the memory.

11. The processor of claim 6, wherein the processor comprises:
a second compute complex including a second security key identifier map and a plurality of compute cores, wherein the second security key identifier map includes a mapping of the system-level security key identifier to a local-level security key identifier having fewer bits than the system-level security key identifier.

12. The processor of claim 11, wherein the local-level security key identifier is assigned to one of the plurality of compute cores authorized to access data in a memory associated with the system-level security key identifier.

13. The processor of claim 12, wherein the second compute complex is further to:
receive, at the second security key identifier map, an untranslated memory access request including a memory address value and the local-level security key identifier; and
generate, based on the second security key identifier map, the memory access request; and
transmit the memory access request to the memory controller.

14. The processor of claim 13, wherein the second compute complex is further to:
translate, based on a mapping within the second security key identifier map, the local-level security key identifier of the untranslated memory access request to the system-level security key identifier, wherein the system-level security key identifier includes more bits than the local-level security key identifier.

15. A processing system, comprising:
a first compute complex including a plurality of compute cores and a first security key identifier map; and
a security module configured to assign a system-level security key identifier to one of the plurality of compute cores in the first compute complex, wherein the first security key identifier map is configured to map the system-level security key identifier to a local-level security key identifier having fewer bits than the system-level security key identifier, and wherein the local-level security key identifier is assigned to a virtual machine executing at least one of plurality of processor cores.

16. The processing system of claim 15, wherein the system-level security key identifier authorizes the one of the plurality of compute cores to access data in a memory of the processing system associated with the system-level security key identifier.

17. The processing system of claim 15, wherein the first security key identifier map is configured to receive a memory access request including a memory address value and the local-level security key identifier, and wherein the first security key identifier map is further configured to translate the local-level security key identifier to the system-level security key identifier.

18. The processing system of claim 17, wherein the processing system is configured to transmit the memory access request from a memory controller to a memory of the processing system, and wherein the processing system is further configured to access data at the memory address value of the memory using a security key corresponding to the system-level security key identifier.

19. The processing system of claim 18, wherein the processing system is configured to decrypt data read from the memory address value of the memory using the security key corresponding to the system-level security key identifier.

20. The processing system of claim 18, wherein the memory controller is configured to transmit the memory access request to a second compute complex to request data associated with the memory address value.

* * * * *